United States Patent
Diehr (10) Patent No.: US 9,559,461 B1
(45) Date of Patent: Jan. 31, 2017

(54) SYSTEM AND METHOD FOR ALIGNING A ROBOTIC CHARGING CONNECTOR WITH A MATING CONNECTOR

(71) Applicant: Fetch Robotics, Inc., San Jose, CA (US)

(72) Inventor: Eric Diehr, San Jose, CA (US)

(73) Assignee: Fetch Robotics, Inc., San Jose, CA (US)

( * ) Notice: Subject to any disclaimer, the term of this patent is extended or adjusted under 35 U.S.C. 154(b) by 0 days.

(21) Appl. No.: 15/138,006

(22) Filed: Apr. 25, 2016

(51) Int. Cl.
*H01R 13/64* (2006.01)
*H01R 13/631* (2006.01)
*H01R 13/652* (2006.01)

(52) U.S. Cl.
CPC ........ *H01R 13/6315* (2013.01); *H01R 13/652* (2013.01); *Y10S 901/01* (2013.01)

(58) Field of Classification Search
CPC ............................ H01R 13/6315; H01R 13/74
USPC ............................ 439/247, 248; 361/679.41
See application file for complete search history.

(56) References Cited

U.S. PATENT DOCUMENTS

| 9,266,440 | B2 * | 2/2016 | Gao ......................... B25J 9/042 |
| 9,436,054 | B2 * | 9/2016 | Brown ................... H01R 41/00 |
| 2008/0084674 | A1 * | 4/2008 | Silverbrook ......... B41J 2/14427 361/739 |

* cited by examiner

*Primary Examiner* — Phuongchi T Nguyen
(74) *Attorney, Agent, or Firm* — J. Steven Svoboda (57) ABSTRACT

A system for aligning a robotic charging connector with a mating connector includes: a robot comprising a charging connector; a self-aligning robotic charging dock comprising a floating interface assembly, the floating interface assembly comprising a floating interface plate, the floating interface assembly further comprising a mating connector, the mating connector configured to snugly mate with the charging connector, the floating interface assembly further comprising a floating interface configured to align the robotic charging connector with the mating connector, the floating interface comprising a sliding surface configured to move against the floating interface plate as the robot docks with the robotic charging dock.

51 Claims, 4 Drawing Sheets

SYSTEM AND METHOD FOR ALIGNING A ROBOTIC CHARGING CONNECTOR WITH A MATING CONNECTOR

PRIORITY CLAIM

The present application claims the priority benefit of U.S. provisional patent application No. 62/152,362 filed Apr. 24, 2015 and entitled "Floating, Self-Aligning Robotic Charging Dock Interface System and Method," the disclosure of which is incorporated herein by reference.

SUMMARY

Embodiments of this invention relate in general to a system and method for aligning a robotic charging connector with a mating connector.

A system for aligning a robotic charging connector with a mating connector includes: a robot comprising a charging connector; a self-aligning robotic charging dock comprising a floating interface assembly, the floating interface assembly comprising a floating interface plate, the floating interface assembly further comprising a mating connector, the mating connector configured to snugly mate with the charging connector, the floating interface assembly further comprising a floating interface configured to align the robotic charging connector with the mating connector, the floating interface comprising a sliding surface configured to move against the floating interface plate as the robot docks with the robotic charging dock.

DETAILED DESCRIPTION

While the present invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the following description and in the several figures of the drawings, like reference numerals are used to describe the same, similar or corresponding parts in the several views of the drawings.

The system for determining and promoting safety of a robotic payload includes a plurality of components such as one or more of electronic components, hardware components, and computer software components. A number of such components can be combined or divided in the system. An example component of the system includes a set and/or series of computer instructions written in or implemented with any of a number of programming languages, as will be appreciated by those skilled in the art.

The system in one example employs one or more computer-readable signal-bearing media. The computer-readable signal bearing media store software, firmware and/or assembly language for performing one or more portions of one or more implementations of the invention. The computer-readable signal-bearing medium for the system in one example comprises one or more of a magnetic, electrical, optical, biological, and atomic data storage medium. For example, the computer-readable signal-bearing medium comprises floppy disks, magnetic tapes, CD-ROMs, DVD-ROMs, hard disk drives, downloadable files, files executable "in the cloud," and electronic memory.

Embodiments of this invention relate in general to a robotic charging dock interface system and method, and more specifically to a self-aligning robotic charging dock interface system and method.

The present invention relates to a mechanism that provides a system and method for a charging connector to move itself so as to self-align with a mating connector as a robot docks for charging.

According to embodiments of the invention, a self-aligning robotic charging dock interface system comprises a charging connector and a mating connector. For example, the robot comprises the charging connector. For example, the self-aligning robotic charging dock interface system comprises the mating connector. The charging connector is configured to mate with the mating connector in order to effect a charging operation.

For example, the charging connector comprises a blind mate connector. For example, the charging connector comprises a female blind mate connector. For example, the charging connector comprises a robot-side female blind mate connector.

For example, the mating connector comprises a blind mate connector. For example, the mating connector comprises a male blind mate connector. For example, the mating connector comprises an interface-side male blind mate connector. For example, the mating connector is approximately cone-shaped.

For example, the male blind mate connector is configured to snugly mate with the female blind mate connector.

According to other embodiments of the invention, a self-aligning robotic charging dock comprises the mating connector and a floating interface. For example, the floating interface comprises a hole configured to snugly fit the mating connector to the charging connector. For example, the floating interface comprises plastic. For example, the floating interface comprises plastic that is low in friction. For example, the floating interface comprises plastic having a coefficient of friction less than or equal to approximately 0.3. For example, the floating interface comprises plastic having a coefficient of friction less than or equal to approximately 0.1. For example, the floating interface comprises one or more of polytetrafluoroethylene (PTFE), acetal, polyoxymethylene (POM), and another plastic offering low friction. For example, the floating interface comprises a material other than plastic that is low in friction. For example, the floating interface is specially shaped so that the mating connector is snugly fitted to the charging connector. For example, the floating interface is approximately dome-shaped.

According to further embodiments of the invention, a floating interface assembly comprises the mating connector and the floating interface. According to still other embodiments of the invention, the floating interface comprises a sliding surface. According to other embodiments of the invention, the floating interface assembly further comprises a floating interface plate. According to still further embodiments of the invention, the floating interface plate moves against the sliding surface as the robot docks with the robotic charging dock.

The sliding surface can do one or more of translate in the plane of the floating interface plate, rotate against the sliding surface of the floating interface plate, and rock against the sliding surface of the floating interface plate.

For example, the floating interface plate is physically connected to the floating interface via one or more springs that allow the floating interface to do one or more of translate in the plane of the sliding surface, rotate against the sliding surface, and rock against the sliding surface. For example, the floating interface can do one or more of translate in the plane, rotate against the sliding surface, and rock against the sliding surface even if the floating interface is compressed as the mating connector pushes on the charging connector. The one or more of translation and rotation allows the charging connector to robustly align with the mating connector to provide an optimized charging connection. For example, the sliding surface comprises aluminum impregnated with one or more of polytetrafluoroethylene (PTFE), acetal, polyoxymethylene (POM), and another plastic offering low friction.

According to still other embodiments of the invention, the charging connector may rotate by between approximately one degree and approximately ten degrees. As a robot docks with the charging dock, the charging connector and the mating connector may be slightly misaligned. According to embodiments of the invention, the misalignment is corrected by the ability of the charging connector to accommodate the exact position of the robot and to mate snugly with the mating connector.

Figure 1A:
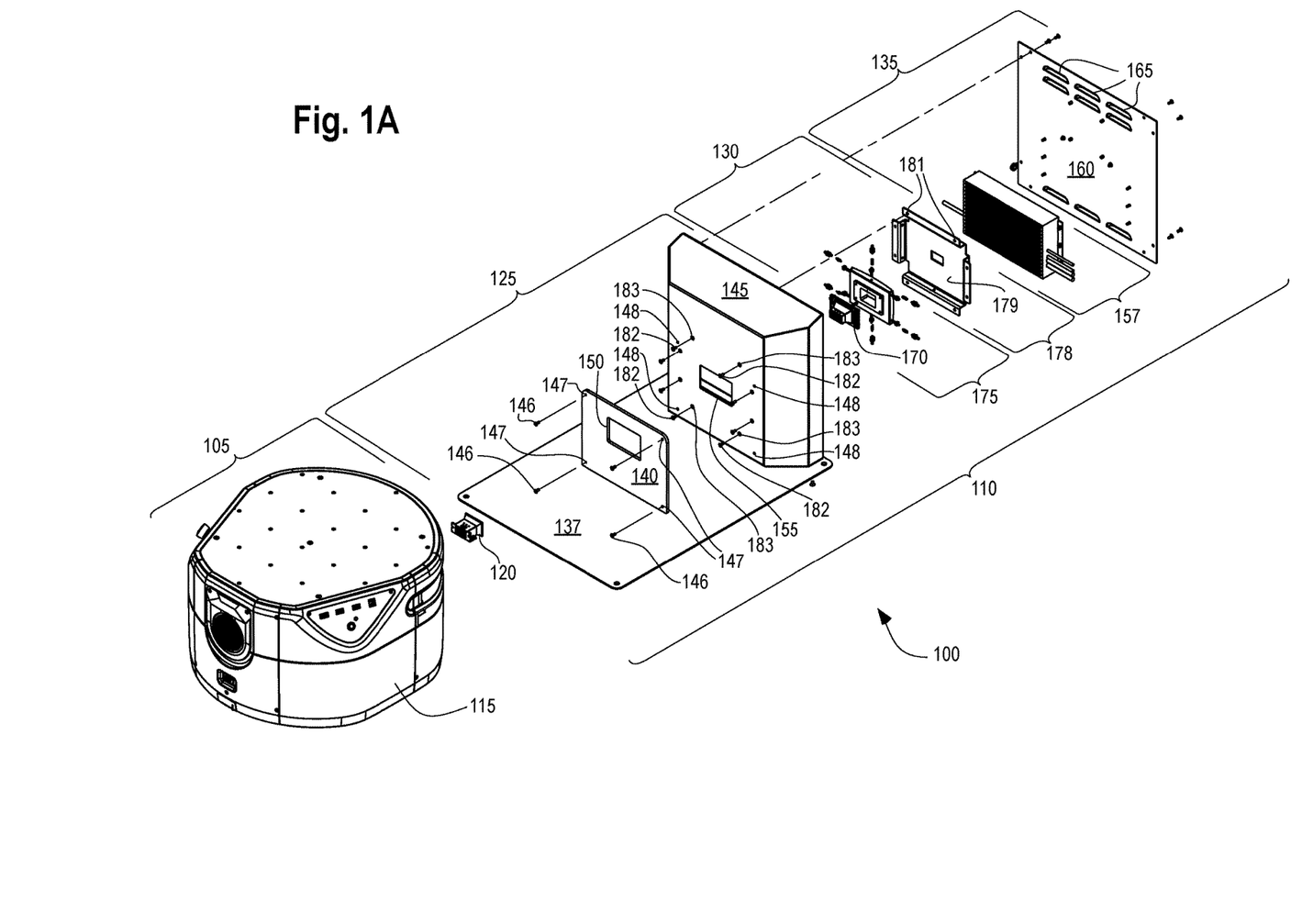
FIG. 1A is an exploded drawing of a self-aligning robotic charging dock interface system.

FIG. 1A is an exploded drawing of a self-aligning robotic charging dock interface system 100. The system 100 comprises a robot 105 and a robotic charging dock 110. The robot 105 comprises a robotic base 115 and a robot-side charging connector 120.

The robotic charging dock 110 comprises a robot interface assembly 125, a floating interface assembly 130, and a back cover assembly 135.

The robot interface assembly 125 comprises a robot interface plate, a front bumper 140 and a front cover 145. Preferably, although not necessarily, the interface front bumper 140 is attached to the front cover 145. Preferably, although not necessarily, the interface front bumper 140 and the front cover 145 are held tightly together by one or more bumper-cover fasteners 146.

As depicted, the front bumper 140 is attached to the front cover 145 using the bumper-cover fasteners 146. As depicted, the bumper-cover fasteners 146 comprise bumper-cover screws 146. The front bumper 140 further comprises front bumper fastener holes 147. The front cover 145 further comprises bumper-cover fastener holes 148. After passing through the front bumper fastener holes 147 and after screwing into the bumper-cover fastener holes 148, the bumper-cover fasteners 146 hold tightly together the front bumper 140 and the front cover 145.

For example, the front bumper 140 comprises rubber. The front bumper 140 is configured to cushion one or more of the robot 105 and the front cover 145 when they come into contact with each other. The front bumper 140 further comprises a front bumper aperture 150.

The front cover 145 is configured to protect the floating interface assembly 130. As depicted, the front cover 145 includes bumper-cover fastener holes 148 and a cover aperture 155. A size of the cover aperture 155 is approximately equal to a size of the front bumper aperture 150. The bumper-cover fasteners 146 pass through the front bumper fastener holes 147 and pass through the cover fastener holes 148.

The back cover assembly 135 comprises a power supply 157 and a back cover panel 160. The back cover panel 160 may optionally comprise one or more vents 165. The vents 165 may help reduce the operating temperature of the robotic charging dock 110. Typically, although not necessarily, a power cable (not shown) runs out through a hole in the back cover panel 160.

The floating interface assembly 130 comprises a mating connector 170, a floating interface 175, and a floating interface plate 178. The floating interface 175 comprises a sliding surface 179. The sliding surface 179 can do one or more of translate in the plane of the floating interface plate 178, rotate against the sliding surface 179 of the floating interface plate 178, and rock against the sliding surface 179 of the floating interface plate 178.

One or more of the front bumper aperture 150 and the cover aperture 155 is configured to comfortably allow the interface-side mating connector 170 to enter through the front bumper aperture 150 and then through the cover aperture 155 to mate with the charging connector 120. As depicted, the front bumper aperture 150 and the cover aperture 155 are configured to comfortably allow the interface-side mating connector 170 to enter through the front bumper aperture 150 and then through the cover aperture 155 to mate with the charging connector 120.

The floating interface plate 178 is configured to hold the floating interface 175 in place while allowing it some freedom of motion as described below. Typically, although not necessarily, the floating interface plate 178 comprises sheet metal. The floating interface plate 178 can comprise one or more flanges 180. As depicted, the floating interface plate 178 comprises four flanges 180. The floating interface plate 178 comprises threaded floating interface plate holes 181. As depicted, the floating interface plate 178 comprises eight floating interface plate holes 181. As depicted, each of the four flanges 180 comprises two threaded floating interface plate holes 181.

As depicted, the front cover 145 is attached to the floating interface plate 178 using cover-plate fasteners 182. As depicted, the cover-plate fasteners 182 comprise cover-plate screws 182. As depicted, the front cover 145 further comprises cover-plate fastener holes 183. As depicted, the front cover 145 comprises eight cover-plate screw holes 183. After passing through the cover-plate fastener holes 183 and after screwing into the threaded cover-plate screw holes 183, the cover-plate fasteners 182 hold tightly together the front cover 145 and the floating interface plate 178. Alternatively, or additionally, one or more nuts (not shown) are screwed onto the back cover sides of one or more of the cover-plate fasteners 182 to hold the cover-plate fasteners 182 tightly in place on the floating interface plate 178.

The floating interface 175 is configured to slide relative to the floating interface plate 178. For example, the floating interface 175 is configured to move against the floating interface plate 178. For example, the floating interface 175 is configured to do one or more of translate, rotate, and rock against the floating interface plate 178. For example, the floating interface 175 is configured to do one or more of translate, rotate, and rock side to side against the floating interface plate 178. For example, the floating interface 175 is configured to rock in a diagonal direction against the floating interface plate 178.

The charging connector 120 will at times not be perfectly centered with the mating connector 170. The floating interface 175 is self-aligning so as to bring the charging connector 120 into alignment with the mating connector 170. If the robot 105 approaches the robotic charging dock 110 from an angle, the floating interface 175 self-aligns so as to line up with the robot 105. More specifically, the floating interface 175 self-aligns so as to align the mating connector 170 with the charging connector 120.

Figure 1B:
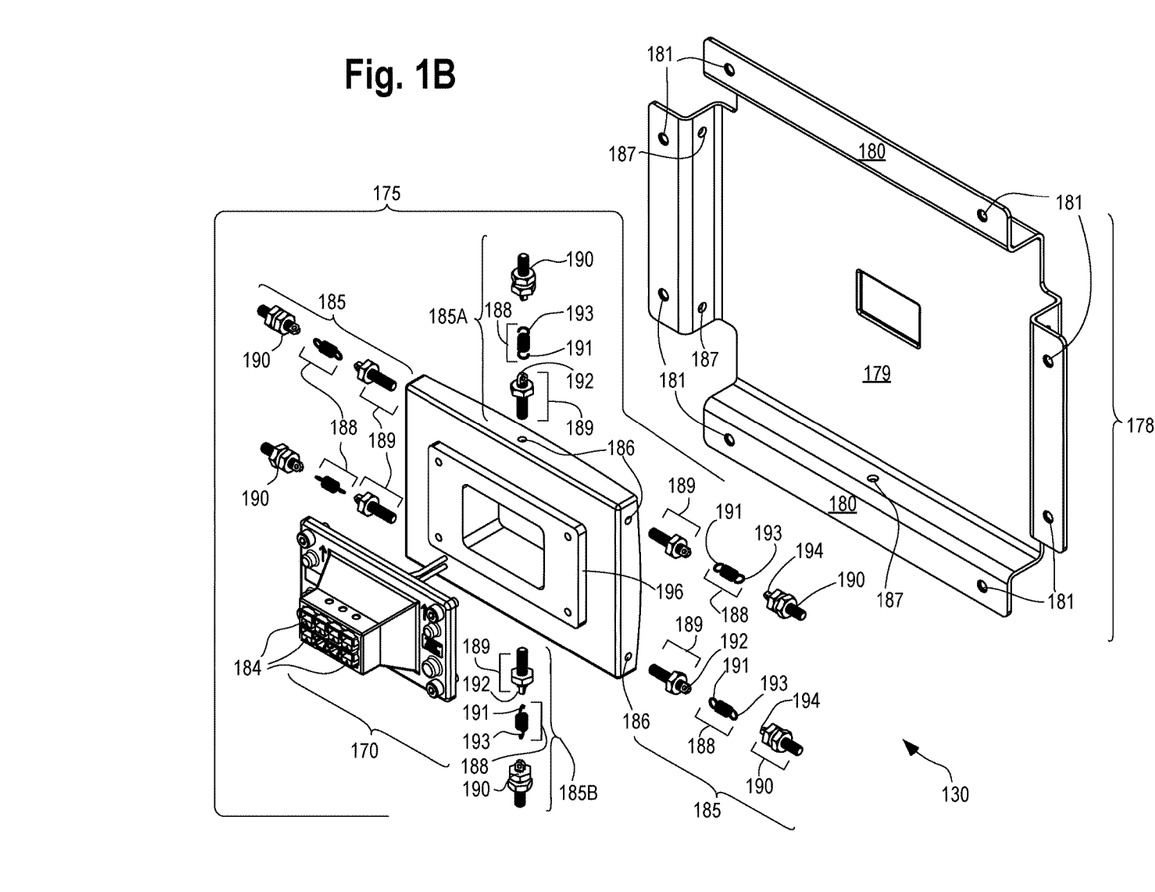
FIG. 1B is an exploded detail view of a floating interface assembly for a self-aligning robotic charging dock interface system.

FIG. 1B is an exploded detail view of a floating interface assembly 130 for a self-aligning robotic charging dock interface system (item 100 in FIG. 1A). FIG. 1B shows an exploded view of the components of the floating interface assembly 130, including the mating connector 170, the floating interface 175, the floating interface plate 178, and the floating interface plate holes 181.

The mating connector 170 comprises at least one mating connector port 184 configured to connect with a corresponding charging connector port (not shown) comprised in the charging connector 120 (not shown in FIG. 1B; item 120 in FIG. 1A). Typically, although not necessarily, the mating connector 170 comprises approximately eight mating connector ports 184. The mating connector ports 184 are configured to mate with corresponding charging connector ports comprised in the charging connector (not shown in FIG. 1B; item 120 in FIG. 1A). As depicted, the mating connector 170 comprises exactly eight mating connector ports 184. The mating connector 170 is configured so that when it connects with the charging connector (not shown in FIG. 1B; item 120 in FIG. 1A), a mating connector port 184 that is the first mating connector port 184 to connect with the corresponding charging connector port (not pictured) is a mating connector port 184 that is already connected with a ground so as to minimize arcing.

A tension-adjustable fastener 185 connects the floating interface 175 to the floating interface plate 178. The tension-adjustable fastener 185 provides an adjustable tension between the floating interface 175 and the floating interface plate 178. The adjustable tension allows a user to select how easily the floating interface 175 moves relative to the floating interface plate 178. The adjustable tension allows the user to select a speed with which the tension-adjustable fastener 185 causes the floating interface 175 to re-center itself relative to the floating interface plate 178. The tension-adjustable fastener allows the floating interface to move against the sliding surface 179 of the floating interface plate 178. For example, the tension-adjustable fastener 185 allows the floating interface 175 to do one or more of translate in the plane of the floating interface plate 178, rotate against the sliding surface 179 of the floating interface plate 178, and rock against the sliding surface 179 of the floating interface plate 178.

As depicted, the floating interface 175 further comprises floating interface holes 186. As depicted, the floating interface 175 comprises six floating interface holes 186. The tension-adjustable fasteners 185 fasten the floating interface 175 to the floating interface plate 178.

As depicted, the tension-adjustable fastener 185 allows the floating interface 175 to move against the sliding surface 179 of the floating interface plate 178. For example, the tension-adjustable fastener 185 allows the floating interface 175 to do one or more of translate in the plane of the floating interface plate 178, rotate against the sliding surface 179 of the floating interface plate 178, and rock against the sliding surface 179 of the floating interface plate 178.

As depicted, the tension-adjustable fastener 185 comprises a spring 188. For example, the spring 188 comprises an anchor spring 188. As depicted, the tension-adjustable fastener 185 further comprises an interface-side anchor screw 189 and a plate-side anchor screw 190. As depicted, the interface-side anchor screw 189 and the plate-side anchor screw 190 are connected by the spring 188. The interface-side anchor screw 189 screws into the floating interface hole 186. The plate-side anchor screw 190 screws into the corresponding floating interface plate hole 187.

As depicted, the spring 188 comprises an interface-side hook 191. As depicted, the interface-side anchor screw 189 comprises an interface-side eyelet 192. The interface-side hook 191 engages with the interface-side eyelet 192, attaching the spring 188 to the interface-side anchor screw 189.

As depicted, the spring 188 comprises a plate-side hook 193. As depicted, the plate-side anchor screw 190 comprises a plate-side eyelet 194. The plate-side hook 193 engages with the plate-side eyelet 194, attaching the spring 188 to the plate-side anchor screw 190. As depicted, the floating interface 175 comprises at least four tension-adjustable fasteners 185. As depicted, the floating interface 175 comprises six tension-adjustable fasteners 185.

As depicted, at least one of the tension-adjustable fasteners 185 comprises the plate-side anchor screw 190, the interface-side anchor screw 189, and the spring 188 connecting the plate-side anchor screw 190 to the interface-side anchor screw 189. As depicted, each of the tension-adjustable fasteners 185 comprises the plate-side anchor screw 190, the interface-side anchor screw 189, and the spring 188 connecting the plate-side anchor screw 190 to the interface-side anchor screw 189.

As depicted, an angle between adjacent tension-adjustable fasteners 185 comprises one of approximately zero degrees and approximately 90 degrees.

A tension on the tension-adjustable fasteners 185 is adjustable so a user can select how easily the floating interface 175 moves relative to the floating interface plate 178. Phrased another way, the floating interface plate 178 is configured to hold the floating interface 175 in place via the tension-adjustable fasteners 185.

The springs 188 align the mating connector 170 relative to the charging connector 120 (not shown in FIG. 1B; item 120 in FIG. 1A). The adjustable tension changes the speed with which the tension-adjustable fasteners 185 (including tension-adjustable fasteners 185A and 185B) align the mating connector 170 relative to the charging connector 120 (not shown in FIG. 1B; item 120 in FIG. 1A).

A weight of the floating interface 175 may be counter-balanced by appropriate adjustment of tension in the tension-adjustable fastener 185. For example, tension in one or more of a top tension-adjustable fastener 185A and a bottom tension-adjustable fastener 185B may be adjusted to compensate for the weight of the floating interface 175. For example, the floating interface 175 including the mating connector 170 may weigh approximately half a pound.

The floating interface 175 further comprises a limit stop 196. The limit stop 196 comprises a raised edge that creates an end stop that butts up against edges of the mating connector 170 and thereby limits the motion of the mating connector 170. As depicted, the limit stop 196 limits the motion of the mating connector 170 to stop it from travelling more than approximately a quarter-inch away from center. This may help prevent breaking or overstretching of one or more of the springs 191A-191D.

Figure 1C:
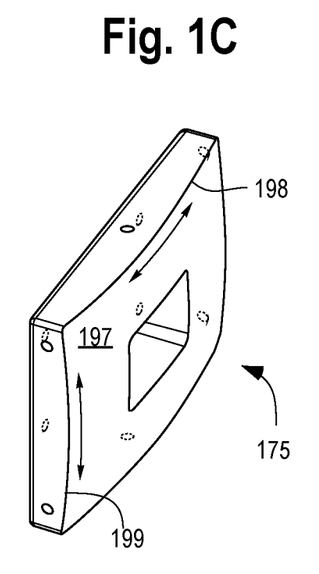
FIG. 1C is a detail view of a floating interface for a self-aligning robotic charging dock interface system.

FIG. 1C is a detail view of a floating interface 175 for a self-aligning robotic charging dock interface system (item 100 in FIG. 1A; not shown in FIG. 1C). For example, the floating interface 175 comprises a material with low friction. For example, the floating interface 175 comprises one or more of polytetrafluoroethylene (PTFE), acetal, polyoxymethylene (POM), and another plastic offering low friction. The floating interface 175 is configured to move quietly so that its movement cannot be discerned by a user.

A back 197 of the floating interface 175 may comprise one or more curved surfaces 198 and 199. For example, the floating interface 175 comprises a horizontally curved surface 198. For example, the floating interface 175 comprises a vertically curved surface 199. One or more of the one or more curved surfaces 198 and 199 is spherically curved. One or more of the one or more curved surfaces 198 and 199 is configured to adjust a position of the floating interface 175 to optimize mating of the charging connector (not shown in FIG. 1C; item 120 in FIG. 1A) and the mating connector (not shown in FIG. 1C; item 170 in FIGS. 1A and 1B). One or more of the one or more curved surfaces 198 and 199 is configured to adjust a position of the floating interface 175 in a plane of the floating interface 175 and perpendicularly to the plane of the floating interface 175 to optimize the mating of the charging connector (not shown in FIG. 1C; item 120 in FIG. 1A) and the mating connector (not shown in FIG. 1C; item 170 in FIGS. 1A and 1B).

Figure 2:
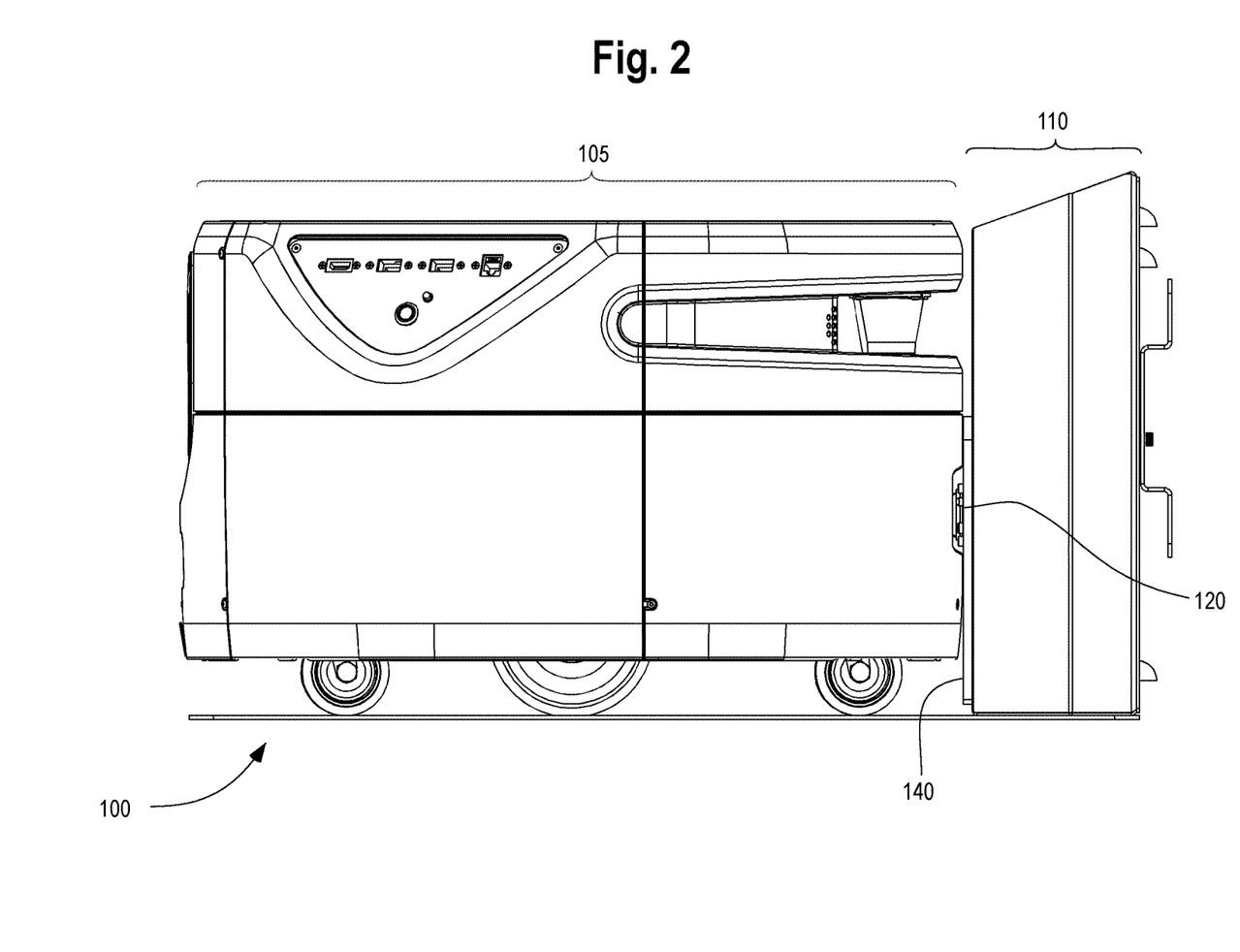
FIG. 2 is a drawing of a robot mating with a self-aligning robotic charging dock pursuant to a self-aligning robotic charging dock interface system.

FIG. 2 is a drawing of the robot 105 mating with the self-aligning robotic charging dock 110 pursuant to the self-aligning robotic charging dock interface system 100. Also depicted are the robot-side charging connector 120 and the front bumper 140.

The representative embodiments and disclosed subject matter, which have been described in detail herein, have been presented by way of example and illustration and not by way of limitation. It will be understood by those skilled in the art that various changes may be made in the form and details of the described embodiments resulting in equivalent embodiments that remain within the scope of the invention. Other representative embodiments can be implemented using one or more of different configurations and different components. For example, details of the assembly of components of the system for aligning a robotic charging connector with a mating connector could be altered without substantially affecting the functioning of embodiments of the invention. For example, screws could be positioned differently. Screws could attach from the opposite side of the device relative to what is depicted in FIGS. 1A and 1B. Other attachment methods not involving screws could be used. For example, embodiments within the scope of the invention would include a robot comprising the mating connector instead of the charging connector, with the robotic charging dock comprising the charging connector. For example, other embodiments within the scope of the invention would use fasteners that are not tension-adjustable. For example, it will be understood by those skilled in the art that software used by the system and method for aligning a robotic charging connector with a mating connector may be located in any location in which it may be accessed by the system. For example, it will be understood by one of ordinary skill in the art that the order of certain fabrication steps and certain components can be altered without substantially impairing the functioning of the invention. It is intended, therefore, that the subject matter in the above description shall be interpreted as illustrative and shall not be interpreted in a limiting sense.

What is claimed is:
1. A system for aligning a robotic charging connector with a mating connector, comprising:
   a robot comprising a charging connector;
   a self-aligning robotic charging dock comprising a floating interface assembly,
   the floating interface assembly comprising a floating interface plate, the floating interface assembly further comprising a mating connector,
   the mating connector configured to snugly mate with the charging connector,
   the floating interface assembly further comprising a floating interface configured to align the robotic charging connector with the mating connector,
   the floating interface comprising a sliding surface configured to move against the floating interface plate as the robot docks with the robotic charging dock.

2. The system of claim 1, wherein the sliding surface does one or more of translate in a plane of the sliding surface, rotate against the sliding surface, and rock against the sliding surface.

3. The system of claim 1, wherein the floating interface assembly further comprises a floating interface plate configured to hold the floating interface in place while allowing the floating interface some freedom of motion.

4. The system of claim 1, wherein the mating connector comprises a blind mate connector.

5. The system of claim 1, wherein the mating connector is approximately cone-shaped.

6. The system of claim 1, wherein the charging connector comprises a blind mate connector.

7. The system of claim 1, wherein the charging connector is configured to rotate by between approximately one degree and approximately ten degrees.

8. The system of claim 1, wherein the floating interface is configured to align the robotic charging connector with the mating connector if the robot approached the robotic charging dock from an angle.

9. The system of claim 1, wherein the floating interface comprises one or more of polytetrafluoroethylene (PTFE), acetal, polyoxymethylene (POM), and another plastic offering low friction.

10. The system of claim 1, wherein, the floating interface is specially shaped so that the mating connector is snugly fitted to the charging connector.

11. The system of claim 1, wherein the floating interface is approximately dome-shaped.

12. The system of claim 1, wherein the floating interface comprises a sliding surface.

13. The system of claim 1, wherein the sliding surface comprises aluminum impregnated with one or more of polytetrafluoroethylene (PTFE), acetal, polyoxymethylene (POM), and another plastic offering low friction.

14. The system of claim 1, wherein the sliding surface can do one or more of translate in the plane, rotate against the sliding surface, and rock against the sliding surface even if the floating interface is compressed as the mating connector pushes on the charging connector.

15. The system of claim 1, wherein the floating interface further comprises a limit stop configured to limit motion of the mating connector.

16. The system of claim 15, wherein the limit stop comprises a raised edge configured to stop motion of the floating interface that creates an end stop that butts up against the mating connector and thereby limits the motion of the mating connector.

17. The system of claim 1, wherein the floating interface comprises plastic.

18. The system of claim 17, wherein the floating interface comprises plastic that is low in friction.

19. The system of claim 18, wherein the floating interface comprises plastic having a coefficient of friction less than approximately 0.3.

20. The system of claim 18, wherein the floating interface comprises plastic having a coefficient of friction less than approximately 0.1.

21. The system of claim 1, wherein the floating interface comprises a curved surface.

22. The system of claim 21, wherein the curved surface is approximately spherically curved.

23. The system of claim 21, wherein the floating interface plate comprises one or more of a horizontally curved surface and a vertically curved surface.

24. The system of claim 21, wherein the curved surface is configured to adjust a position of the floating interface to optimize the mating of the charging connector and the mating connector.

25. The system of claim 24, wherein the curved surface is configured to adjust a position of the floating interface in the plane of the floating interface and perpendicularly to the plane of the floating interface to optimize the mating of the charging connector and the mating connector.

26. The system of claim 1, wherein the charging assembly further comprises a robot interface assembly, the robot interface assembly comprising a front cover configured to protect the floating interface assembly.

27. The system of claim 26, wherein the robot interface assembly further comprises a front bumper configured to cushion one or more of the robot and the front cover when they come into contact with each other.

28. The system of claim 27, wherein the floating interface assembly further comprises a robot interface plate configured to attach to one or more of the front bumper and the front cover.

29. The system of claim 27, wherein the front bumper comprises a front bumper aperture.

30. The system of claim 29, wherein the front cover comprises a cover aperture.

31. The system of claim 30, wherein a size of the front bumper aperture is approximately equal to a size of the cover aperture.

32. The system of claim 31, wherein one or more of the front bumper aperture and the cover aperture is configured to comfortably allow the mating connector to enter through the front bumper aperture and then through the cover aperture to mate with the charging connector.

33. The system of claim 1, wherein the floating interface assembly further comprises a tension-adjustable fastener that connects the floating interface to the floating interface plate, the tension-adjustable fastener configured to provide a tension between the floating interface and the floating interface plate.

34. The system of claim 33, wherein the tension-adjustable fastener s the mating connector relative to the charging connector.

35. The system of claim 33, wherein a weight of the floating interface may be counterbalanced by adjusting a tension in the tension-adjustable fastener.

36. The system of claim 33, wherein the tension between the floating interface and the floating interface plate is adjustable.

37. The system of claim 36, wherein the adjustable tension allows a user to select how easily the floating interface moves relative to the floating interface plate.

38. The system of claim 36, wherein the adjustable tension allows a user to select a speed with which the tension-adjustable fastener causes the floating interface to re-center itself relative to the floating interface plate.

39. The system of claim 36, wherein the tension-adjustable fastener comprises a spring that allows the floating interface to do one or more of translate in the plane of the sliding surface, rotate against the sliding surface, and rock against the sliding surface.

40. The system of claim 39, wherein the tension-adjustable fastener comprises a plate-side anchor screw fastened to the floating interface plate, an interface-side anchor screw fastened to the floating interface, and a spring connecting the plate-side anchor screw to the interface-side anchor screw.

41. The system of claim 40, wherein the spring comprises an anchor spring.

42. The system of claim 40, wherein the plate-side anchor screw screws into the floating interface plate.

43. The system of claim 40, wherein the interface-side anchor screw screws into the floating interface.

44. The system of claim 40, wherein the spring comprises an interface-side hook that attaches the spring to the interface-side anchor screw.

45. The system of claim 40, wherein the spring comprises a plate-side hook that attaches the spring to the plate-side anchor screw.

46. The system of claim 40, wherein the floating interface assembly comprises at least four tension-adjustable fasteners.

47. The system of claim 46, wherein at least one of the tension-adjustable fasteners comprises the plate-side anchor screw, the interface-side anchor screw, and the spring connecting the plate-side anchor screw to the interface-side anchor screw.

48. The system of claim 47, wherein each of the tension-adjustable fasteners comprises the plate-side anchor screw, the interface-side anchor screw, and the spring connecting the plate-side anchor screw to the interface-side anchor screw.

49. The system of claim 46, wherein an angle between adjacent tension-adjustable fasteners comprises one of approximately zero degrees and approximately 90 degrees.

50. The system of claim 47, wherein the weight of the floating interface is counterbalanced by adjusting the tension in one or more of the springs.

51. The system of claim 50, wherein the weight of the floating interface is counterbalanced by adjusting the tension in one or more of a top tension-adjustable fastener and a bottom tension-adjustable fastener.

* * * * *

UNITED STATES PATENT AND TRADEMARK OFFICE
CERTIFICATE OF CORRECTION

| | | |
|---|---|---|
| PATENT NO. | : 9,559,461 B1 | Page 1 of 1 |
| APPLICATION NO. | : 15/138006 | |
| DATED | : January 31, 2017 | |
| INVENTOR(S) | : Eric Diehr | |

It is certified that error appears in the above-identified patent and that said Letters Patent is hereby corrected as shown below:

On the Title Page

Please add a "Related U.S. Application Data" section with the following text: "Provisional application No. 62/152,362, filed on April 24, 2015."

Signed and Sealed this
Twenty-fifth Day of February, 2025

Coke Morgan Stewart
*Acting Director of the United States Patent and Trademark Office*